UNITED STATES PATENT OFFICE.

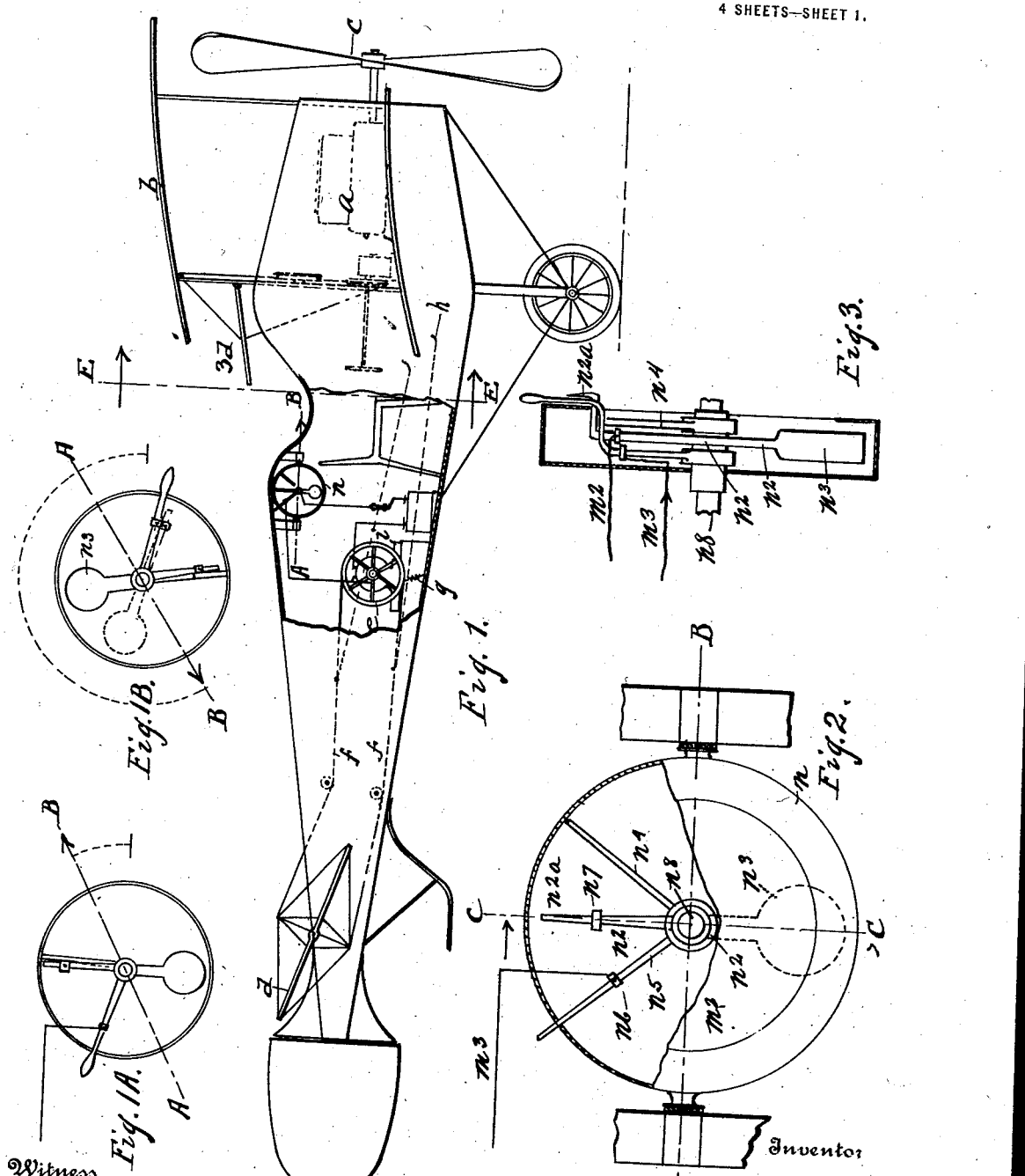

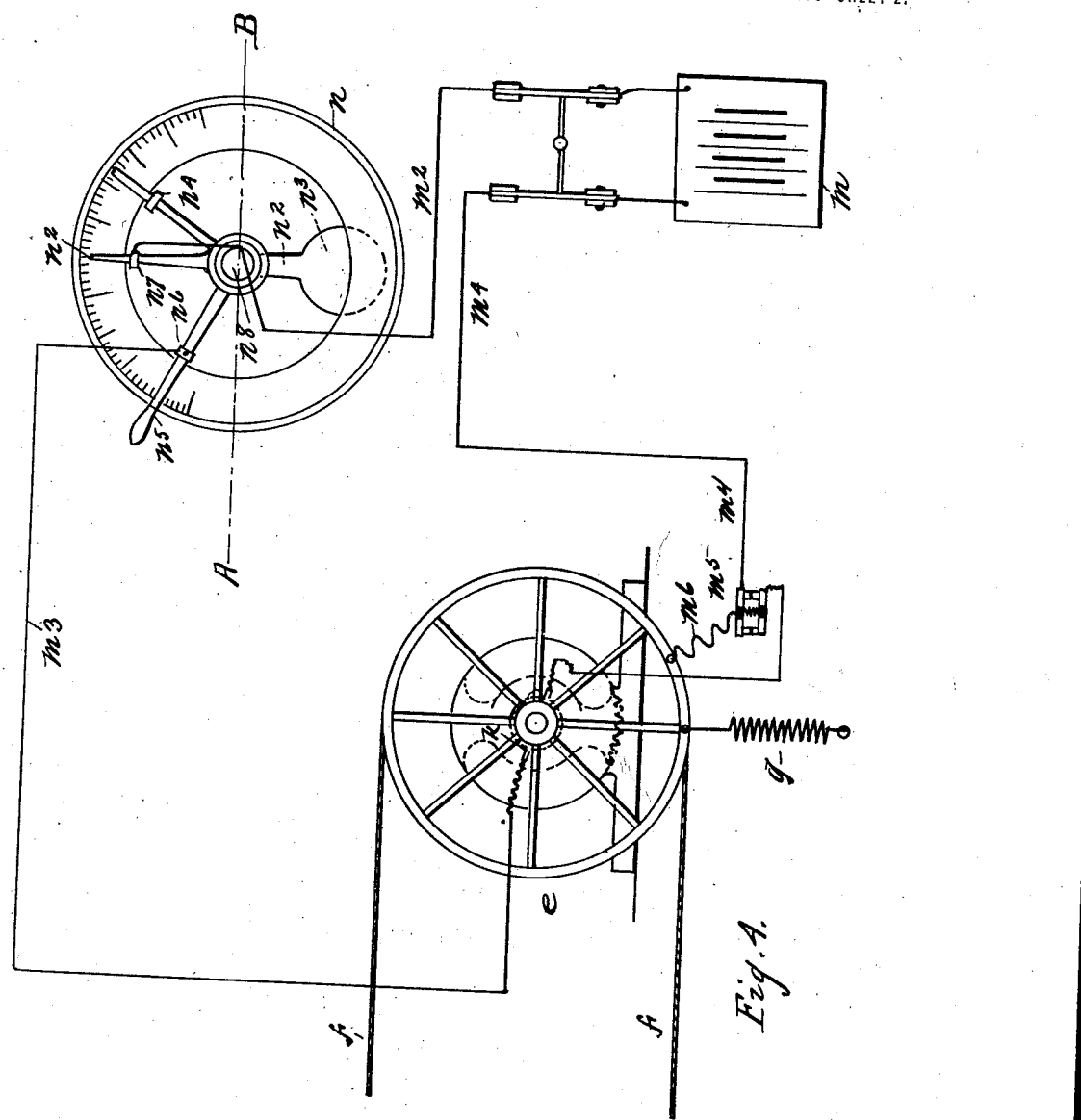

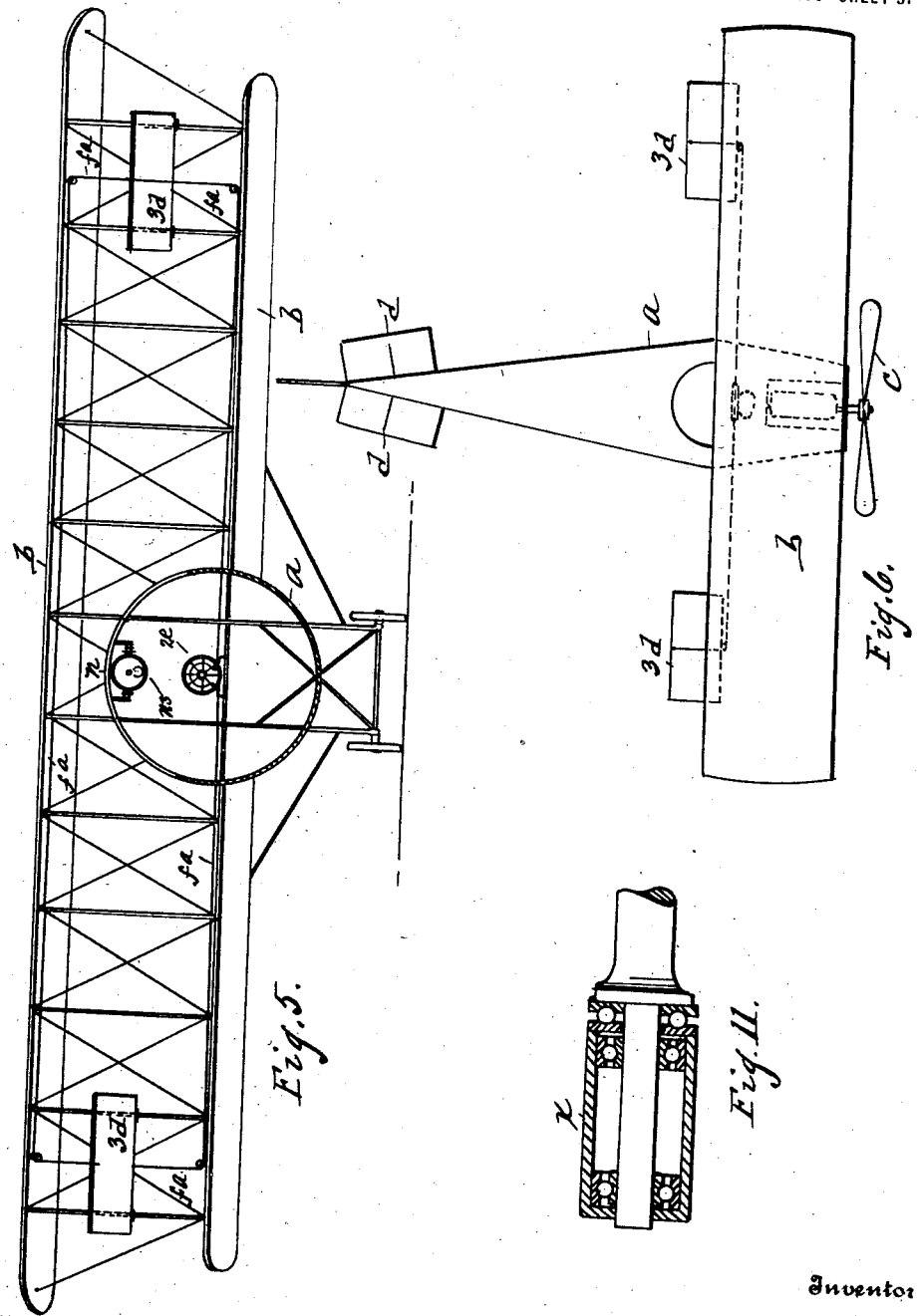

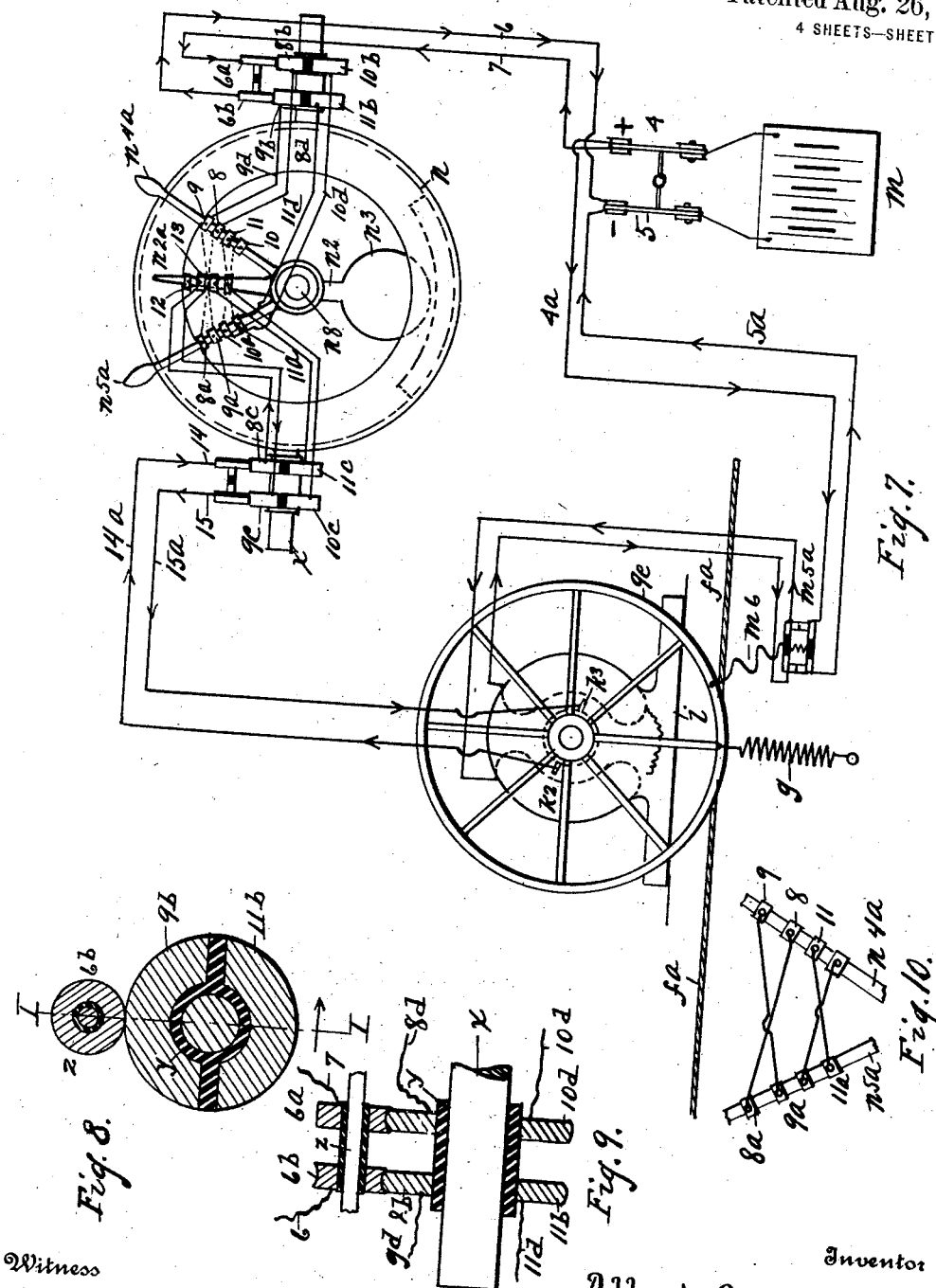

ALBERT OSWALD HAGEN, OF DETROIT, MICHIGAN, ASSIGNOR OF ONE-HALF TO CLARK BENNETT, OF DETROIT, MICHIGAN.

STABILIZER FOR AIRPLANES.

1,314,395.  Specification of Letters Patent.  Patented Aug. 26, 1919.

Application filed November 12, 1917. Serial No. 201,443.

*To all whom it may concern:*

Be it known that I, ALBERT OSWALD HAGEN, a citizen of the United States, residing at Detroit, county of Wayne, State of Michigan, have invented a certain new and useful Improvement in Stabilizers for Airplanes; and declare the following to be a full, clear, and exact description of the same, such as will enable others skilled in the art to which it pertains to make and use the same, reference being had to the accompanying drawings, which form a part of this specification.

My invention relates to airplanes and an object of my improvements is to provide an apparatus for automatically maintaining an airplane in its normal position or restoring it to its normal position when displaced therefrom. My improved apparatus is adapted to be applied to control the position of the plane about its transverse axis or about its longitudinal axis.

In the accompanying drawings:

Figure 1 is a side elevation of an airplane embodying my invention, the side of the body being partly broken away to show the apparatus inclosed therein.

Fig. 1$^a$ is a diagram illustrating the action of the automatic circuit-controlling apparatus when the airplane has commenced to move in a loop and is turned to a small predetermined angle.

Fig. 1$^b$ is a diagram showing the position of the parts of the circuit-controlling apparatus when the plane has turned to a considerably greater angle than that shown in Fig. 1$^a$.

Fig. 2 is an elevation of the automatic circuit-controlling apparatus, the casing being partly broken away.

Fig. 3 is a section on the line C—C Fig. 2.

Fig. 4 is a diagram of the automatic controlling apparatus including the electrical circuits as applied to controlling the position of the airplane about its transverse axis.

Fig. 5 is a section on the line E—E Fig. 1, looking in the direction of the arrow.

Fig. 6 is a plan view of the plane.

Fig. 7 is a diagrammatic view of the automatic regulating apparatus with the electrical circuits as applied to control the position of the plane about its longitudinal axis.

Fig. 8 is a detail view of the commutating apparatus.

Fig. 9 is a section on the line I—I Fig. 8.

Fig. 10 is a detail diagrammatic view showing the arrangement of the contact points to secure the reversing of the flow of the current.

Fig. 11 is a sectional view showing the ball bearings for the casing inclosing the automatic circuit controlling apparatus.

$a$ is the body of an airplane, $b\ b$ are the planes, $c$ is the propeller, $d$ is the horizontal rudder, elevator or plane for stabilizing the airplane about its transverse axis. $e$ is the wheel around which the cables $f\ f$ pass which connect with the elevator $d$ to regulate the position of the same. $g$ is a tension spring attached to the wheel $e$ and adapted to hold or return said wheel to the position at which the elevator $d$ is in its position parallel to the center line of the body of the plane. $h$ are the pedals by which the wheel $e$ is turned.

$i$ (Fig. 4) is an electric motor connected with the wheel $e$ so as to turn said wheel. $k$ are the brushes bearing on the commutator of the motor. $m$ is a source of electricity as for instance a storage battery. $m^2$ is a conductor leading from one pole of the battery $m$ and $m^4$ is a conductor leading from the other pole of said battery. There is a make-and-break apparatus $m^5$ interposed in the conductor $m^4$ which is normally held closed by a spring. The device $m^5$ has its armature connected by a cord $m^6$ to the wheel $e$. In the normal position of the wheel $e$ the cord $m^6$ is lose and the cord has such a length that when the wheel $e$ is turned to the desired limit of its travel in either direction, the armature of the make-and-break device $m^5$ will be drawn out of contact by said cord and thus the motor will stop.

$n$ is a casing fixed upon the body $a$ of the airplane. $n^8$ is a shaft concentric with the casing $n$ and extending therethrough. Upon the shaft $n^8$ is pivoted so as to turn freely a lever $n^2$ having at its lower end the counter balance weight $n^3$. The lever arm $n^2$ is located within the casing $n$ but at its upper end is bent and extends through an arcuate slot in the front wall of the casing $n$ terminates in a pointer $n^{2a}$ which travels over a graduated scale on the outer surface of said casing.

$n^4$ is a lever arm pivoted upon the shaft $n^8$ so as to have considerable friction. Said arm is pivoted upon the shaft within the casing $n$ and is bent out through the slot in the front wall of said casing and extends outward over the graduated scale and terminates in a handle by which its angular position about the axis $n^8$ may be adjusted.

$n^5$ is another lever arm frictionally pivoted within the casing $n$ upon the shaft $n^8$ and extending through the slot in the front wall of said casing and over the graduated scale and terminating in a handle by which said lever arm may be angularly adjusted about said shaft.

The lever arm $n^2$ is located between the lever arms $n^4$ $n^5$ and its angular motion about the shaft $n^8$ is limited by said arms.

$n^6$ is a contact point on the lever arm $n^5$ connected by a conductor $m^3$ with one of the brushes $k$. $n^7$ is a contact point on the arm $n^2$ with which the conductor $m^2$ is connected.

When the airplane is turned to such a position that the lever arm $n^2$ being held in a vertical position by the counter weight $m^3$ turns so as to make contact between the points $n^6$ and $n^7$ a circuit is established from the battery $m$ through the conductor $m^2$, contacting points $m^7$ $m^6$, conductors $m^3$ through the armature and back to the battery through the make-and-break device $m^5$ and conductor $m^4$.

A—B is a line drawn through the axis of the shaft $n^8$ parallel to the center line of the body $a$, the forward part of said line being indicated by an arrow head and the letter B.

The operation of the above described device is as follows:

The arms $n^4$ $n^5$ are set at the desired angle by the operator (and preferably locked in the adjusted position by any conventional lock) and when the plane has turned downward sufficiently to bring the contact points $n^6$ and $n^7$ together, a circuit is completed through the motor $i$ and the wheel $e$ is turned thereby to the limit of its travel, turning the elevator $d$, as shown in Fig. 7, to a position in which it shall act to restore the plane to its horizontal position so that too steep a descent will not be made.

When the plane goes into a loop it first rises to the angle at which the lever arm $n^4$ is placed, which brings the arm $n^2$ to the limit of its travel in that direction, and against the arm $n^4$, as shown in Fig. 1ª. The plane continues to turn in a negative direction until it reaches the position shown in Fig. 1ᵇ in which the counterbalance weight $n^3$ is carried up to the vertical position and a little beyond. The counterweight then falls into the position shown in dotted lines making a contact between the points $n^6$ and $n^7$ and completing the circuit through the motor $i$, so that said motor shall be actuated to turn the elevator to the position shown in Fig. 1 and automatically causing the plane to complete the loop and bringing it back to a horizontal position at which the counter weight $n^3$ acts to again break the circuit through the motor, as shown in Fig. 1. Thus the plane is automatically carried by the dangerous angle in making the loop.

The application of my invention to automatically control the position of the airplane about its longitudinal axis is more particularly illustrated in Figs. 5 to 11 inclusive.

$3^d$ are the ailerons, or planes, for stabilizing the airplane about its longitudinal axis.

Referring in the first place to Figs. 5 and 6, $2^e$ is a wheel corresponding to the wheel $e$ above referred to having the cables $f^a$ extending around it, which cables extend to and control the position of the ailerons $3^d$. There is a motor $i$ connected to the wheel $2^e$ to actuate the same. In this case there is provision for maintaining the polarity of the field constant even when the current is reversed in the armature. The method shown is a shunt circuit from the battery $n$ through the conductor $4^a$, the field coil and returning by the conductor $5^a$ to the battery. There is a circuit interrupting switch $m^{5a}$ interposed in this circuit which is operated by a cord $m^6$, as above described, to limit the range of actuation of the motor.

The casing $n$ in this case is pivoted on antifriction bearings $x$ so as to readily turn around a transverse axis and the casing may be weighted at its lower periphery although the weight $n^3$ will be sufficient to maintain the casing $n$ in its vertical position.

In the present case where the object is to stabilize the airplane about its longitudinal axis, it is necessary that the apparatus should be arranged to automatically actuate the wheel in either direction. To this end I provide for automatically changing the direction of the current through the armature of the motor $i$ as follows: I place two contact points 12 and 13 upon the lever arm $n^2$ and connect these points respectively with the brushes $k^2$ $k^3$ of the motor $i$. Upon the lever arms $n^{4a}$ and $n^{5a}$ I place contact points, respectively, 8—9 and $8^a$—$9^a$ in position to be contacted by the points 12—13 when the lever arm $n^2$ is swung to the limit of its travel in the one direction or the other. The contact point 8 is permanently connected to the contact point $8^a$ and the contact point 9 is permanently connected to the contact point 9ª. The positive pole of the battery is connected to the contact point 8 and negative pole the contact point 9.

Now it will be seen that the operation of the automatic device for stabilizing the airplane about its longitudinal axis so far as has been described will be as follows:

As the plane turns with the left hand side downward the contact points 12 and 13 will be brought into connection with the contacts 9 and 8, respectively, the circuit will then be completed as follows: From the positive pole 4 of the battery through the various conducting parts to the contact point 8 then to the contact point 13 and from that to the brush $k^3$ of the motor, through the armature coil and back through the various conductors, to the contact point 12 thence to the contact point 9 and back through the various conductors to the negative pole of the battery as indicated by the arrows.

Should the plane turn with its right hand side farthest down, the point 12 and 13 will come, respectively, into contact with the points 8ª and 9ª on the lever arm $n^{5a}$. The circuit will then be from the positive pole 4 of the battery through the various conductors to the contact point 8ª to the contact point 12 and through the various conductors to the brush $k^2$ through the armature coils to the contact point 13 to the contact point 9ª and through the various conductors back to the negative pole of the battery. It will be noticed that this circuit is in the opposite direction from that above described, and the motor will be turned in the opposite direction so as to shift the ailerons to return the machine toward its normal horizontal position.

Should the plane turn in a loop beyond 90 degrees it will be necessary to have the automatic apparatus act in the opposite sense from that above described for the normal position of flight. To provide for this I duplicate the electrical connections on the lever arms $n^2$ $n^{4a}$ and $n^{5a}$ as indicated at 10ª 11ª and 12ª 13ª and I provide two part commutators with their parts insulated by the material $y$ (Figs. 8 and 9) and provide brushes 6ª 6ᵇ insulated from each other by the insulating material $z$ and making the contact with the said commutators.

When the position of the airplane is reversed the commutators are turned so that their conducting sections or part 10ᵇ 11ᵇ are in electrical connection, respectively, with the brushes 6ª and 6ᵇ and the sections 8ᵇ 9ᵇ are thrown out of circuit.

Now the circuits will be as follows: From the positive pole 4 of the battery through the conductor 7 to the brush 6ª to the commutator section 10ᵇ through the conductor 10ᵈ to the contact point 10ª thence to the contact point 10 to the point 13ª to the commutator section 10ᶜ to the brush 15 through the conductor 15ª to the brush $k^3$ through the armature coil out at the brush $k^2$ through the conductor 14ª to the brush 14 to the commutator section 11ᶜ through the conductor to the contact point 12ª to the contact point 11 to the contact point 11ª through the conductor 11ᵈ to the commutator section 11ᵇ to the brush 6ª to the conductor 6 and back to the negative pole of the battery. Or in case the plane has turned in the opposite direction, the circuit will be from the positive pole 4 through the conductor 7 to the brush 6ª to the commutator section 10ᵇ to the contact point 10ª to the contact point 12ª to the commutator section 10ᶜ the brush 14 the conductor 14ª the brush $k^2$ through the armature coil out at the brush $k^3$ through the conductor 15ª to the brush 15 to the commutator section 10ᶜ through a conductor to the contact 13ª to the contact point 11ª through the conductor 11ᵈ to the commutator section 11ᵇ to the brush 6ᵇ and through the conductor 6 to the negative pole of the battery and the wheel 2ᵉ will be turned in the opposite direction to right the airplane from this position.

It will be seen that with the above device the stabilizing of the airplane is automatic at all necessary angles and whether right side up or upside down. The control of the airplane may be learned with greater confidence and efficiency, and that in coming out of the loop the danger of the "nose dive" is avoided and the aviator can set the control and coöperate with his assistant in offensive or defensive work, that one of the occupants of the plane can assist the other in case he is wounded and if the aviator is disabled, the automatic control can be set and the return made without danger.

What I claim is:

1. In an airplane, the combination of a stabilizing plane, and an automatic means adapted to return said plane to its intermediate position when displaced therefrom, a motor adapted to displace said plane from its intermediate position, an automatic means for controlling said motor, and means for breaking the energizing current through said motor at a predetermined displacement of the plane.

2. In an airplane, the combination of a stabilizing plane, means for actuating said stabilizing plane, and a spring acting to return said actuating means to its intermediate position, a motor adapted to displace said stabilizing plane from its intermediate position, and means for deënergizing said motor at a predetermined displacement of the plane.

3. In an airplane, the combination of a stabilizing plane, means for actuating said stabilizing plane, and a spring acting to return said actuating means to its intermediate position, a motor adapted to displace said actuating means from its intermediate position, and means for breaking the energizing circuit through said motor at a predetermined displacement of the plane.

4. In an airplane, the combination of a stabilizing plane therefor, and an electric motor adapted to actuate said plane, a counted weighted lever, a source of electricity and means whereby said lever shall complete a circuit through said motor when said airplane has turned a predetermined distance from its horizontal position, and means for reversing the connections through said circuit when said airplane has turned beyond a 90 degree angle.

5. In an airplane, a stabilizing plane, means for actuating said plane, a counter balanced lever adapted to control the position of said plane when turned to one side or the other relative to a perpendicular upon said plane, said counter balanced lever being supported in bearings at right angles to its axis, a commutator on said support, and means whereby said commutator shall shift the direction of the current through the actuating circuit when the support for the counter balanced lever has turned beyond an angle of 90 degrees to a perpendicular to the airplane.

6. In an airplane, a stabilizing surface, an electric motor for actuating said surface, a counter balanced lever, a lever arm concentric with said counter balanced lever, said lever arm being adjustable in position, and contact points on said counter balanced lever and on said lever arm adapted to make and break the circuit through said electric motor.

7. In an airplane, the combination of a stabilizing plane, an electric motor adapted to actuate said plane, a counter balanced lever carrying two contact points, a lever upon one side of said counter balanced lever carrying two corresponding contact points, a second lever on the other side of said counter balanced lever also carrying two corresponding contact points, the contact points on the levers on one side and the other of said counter balanced lever being connected in pairs by conductors, one of said pairs of contact points being interposed in the out-going branch of the electric circuit and the other of said pairs being interposed in the return branch of the electric circuit.

8. In an airplane, the combination of a stabilizing plane, an electric motor adapted to actuate said plane, a counter balanced lever carrying two contact points, a lever upon one side of said counter balanced lever carrying two corresponding contact points, a second lever on the other side of said counter balanced lever also carrying two corresponding contact points, the contact points on the levers on one side and the other of said counter balanced lever being connected in pairs by conductors, one of said pairs of contact points being interposed in the out-going branch of the electric circuit and the other of said pairs being interposed in the return branch of the electric circuit, a second pair of contact points on said counter balanced lever and two other pairs of corresponding contact points on the lever at one side and the other of said counter balanced lever, and means for interposing one set of contact points or the other set of contact points in said circuit.

In testimony whereof, I sign this specification.

ALBERT OSWALD HAGEN.